Feb. 23, 1932.     W. DIETRICH ET AL     1,846,092
APPARATUS FOR THE PRODUCTION OF COLD
Filed June 17, 1929     2 Sheets-Sheet 1
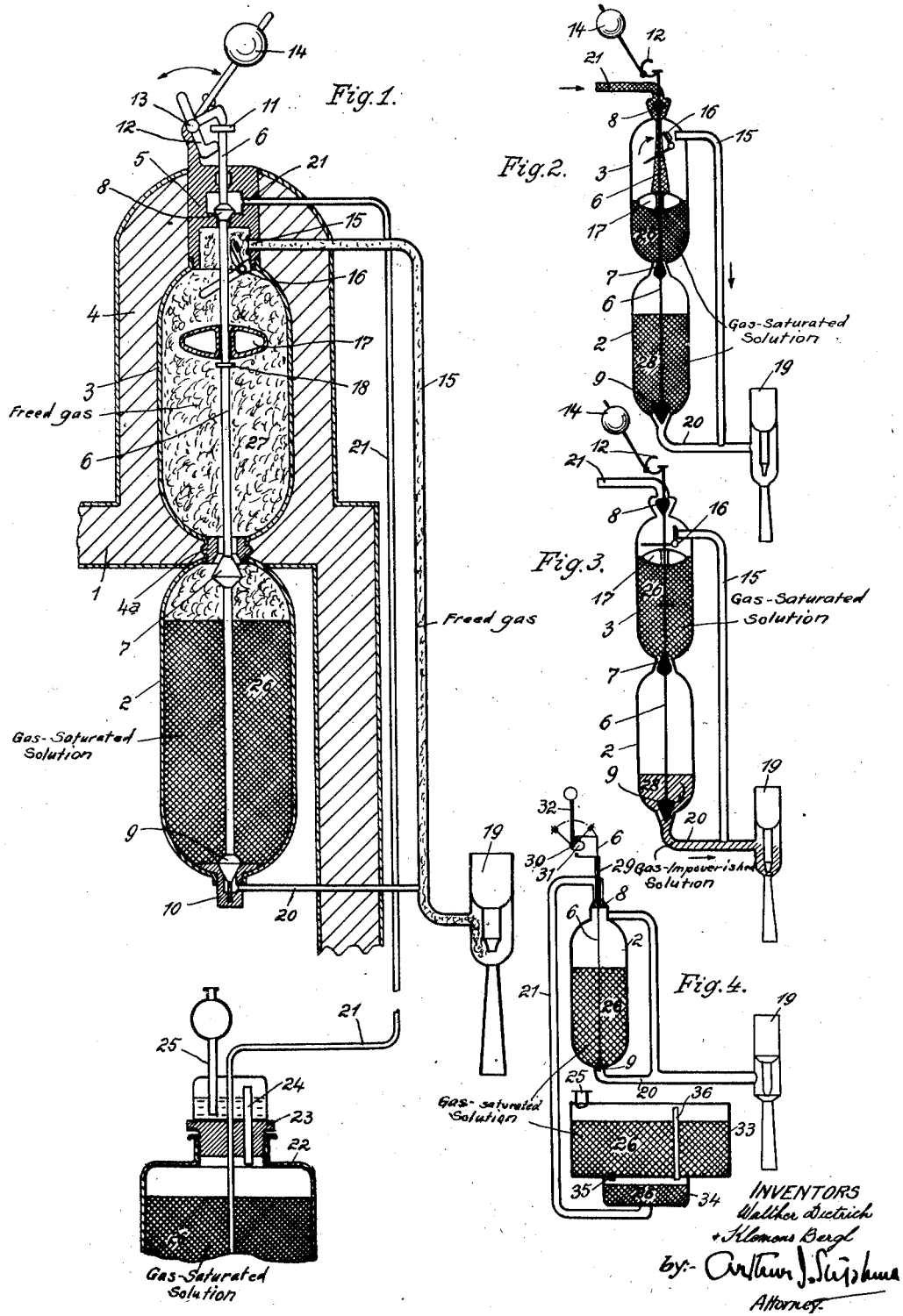

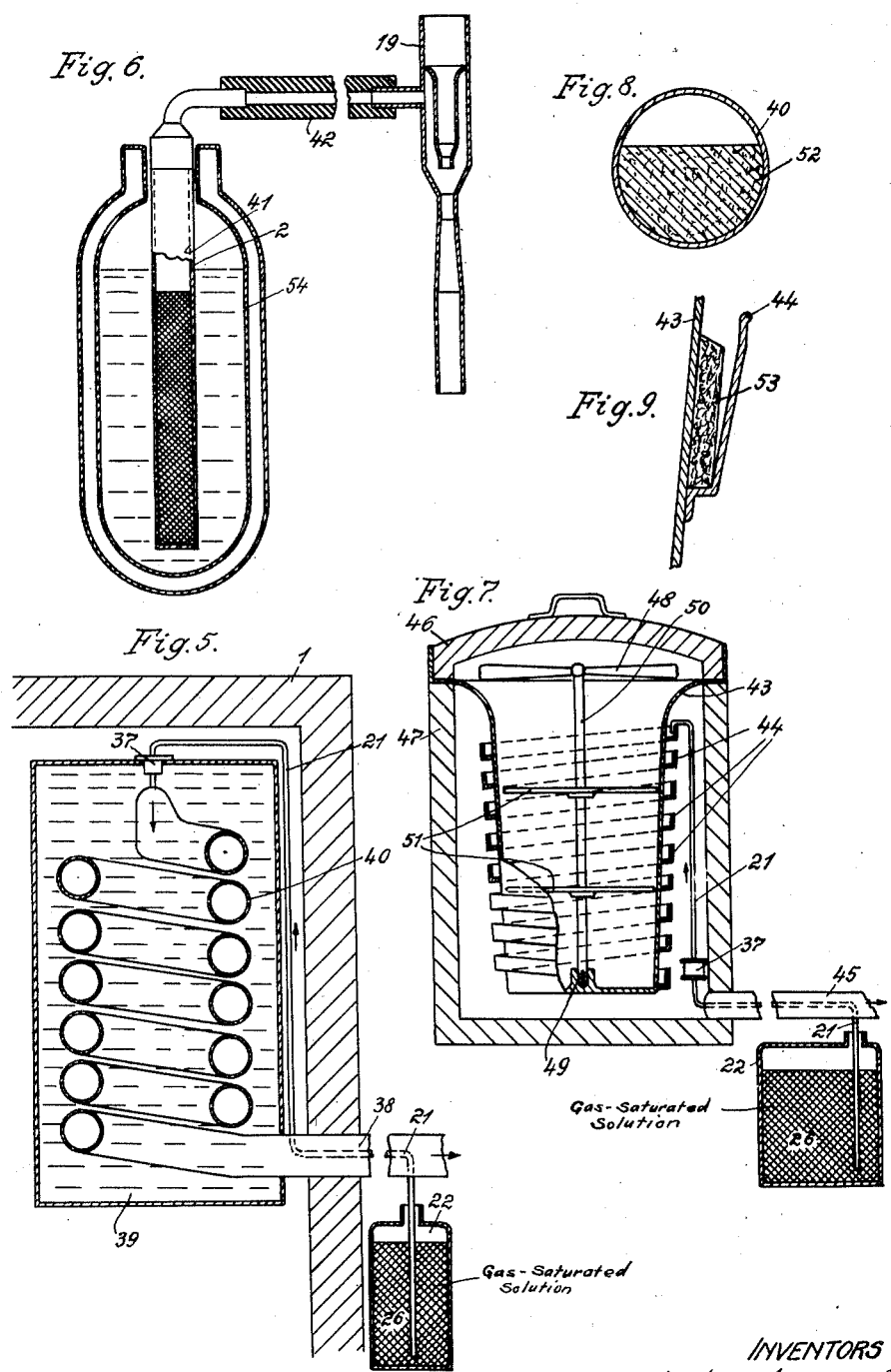

Patented Feb. 23, 1932

1,846,092

UNITED STATES PATENT OFFICE

WALTHER DIETRICH, OF BERLIN-WILMERSDORF, AND KLEMENS BERGL, OF BERLIN-FRIEDENAU, GERMANY

APPARATUS FOR THE PRODUCTION OF COLD

Application filed June 17, 1929, Serial No. 371,633, and in Germany June 23, 1928.

This invention relates to a process for the production of cold by the so-called "open circuit", that is to say in which a cooling agent is used up. For this purpose it is known to use volatile organic liquids such as methyl alcohol, ethyl alcohol and the like whose vapour is sucked up and eventually absorbed by suitable pumps such as water jet pumps.

According to the invention instead of organic liquids solutions of gases can be used which on reduction of pressure yield up the gases in question, so that their latent heat is supplied from the surroundings to be cooled, a cooling action thus taking place.

In order to facilitate the absorption of the escaping vapours by water jet pumps strongly water soluble gases are preferably used, thus powerfully assisting the suction effect of the pumps by the absorption of the gases in the driving water.

Under certain conditions the absorption alone is sufficient to carry off the gases without the help of pumps and to bring the cooling agent employed to vaporization.

A very strong cooling action is obtained for example with commercial spirits of sal-ammoniac as cooling agent, that is with an ammonia solution in water (about 25% ammonium hydrate). Other solutions of gases can however be used, such as hydrogen chloride in water.

When using ammonium hydrate, the ammonia gas is evaporated from its solution by having its pressure reduced in a closed container so that the necessary quantity of heat for vaporization is taken from the surroundings and cools them. The container is evacuated in a known way preferably by a water jet pump whose driving water dissolves and carries away the vaporized gases. When vaporizing a 25% ammonium hydrate solution and using a simple water jet pump which is driven with a water supply at ordinary temperature and pressure, temperatures of −20° C. can be obtained in a very short time.

As compared with organic liquid, gases dissolved in water, such as ammonium hydrate, have the advantage that the cooling agent is quite incombustible and therefore can be used without danger and can be obtained cheaply everywhere in commerce, so that cold can be produced easily and cheaply with the assistance of the ordinary water supply anywhere, even in housholds. With lower water supply pressure or higher temperature of the water supply, lower temperatures are obtained with this cooling agent than for example with methyl or ethyl alcohol.

Because such cooling agents as ammonium hydrate do not evaporate without residue, but always leave at the end an impoverished solution, for carrying on the process it is desirable to use apparatus in which the removal of the used solution and the supply of new cooling agent can proceed largely automatically and in certain cases also continuously, without the user coming into contact with the cooling agent.

Figures 1–5 of the accompanying drawings show particularly suitable apparatus for carrying out the process with especial regard to their use for refrigerators, whilst Figures 6 and 7 show small cooling devices for cooling drinks and making ice and Figures 8 and 9 show certain detail arrangements.

In order more easily to lead off the used up solution and to supply the fresh solution, in Figures 1–4 between the supply container for the cooling agent and the actual evaporation chamber in which the cooling agent is contained during the cooling period, a preliminary container is arranged which is adapted to receive a charge of fresh solution. It is also arranged for the used solution to be led off in the simplest way from the actual evaporation chamber.

In Figures 1–3 the preliminary container serves secondarily as a dome for the evaporation chamber and accordingly is arranged above the actual evaporation chamber.

In this case the evaporation unit consists of two superposed cylindrical chambers, one being the actual evaporation chamber 2 and the other the preliminary container 3 formed as a dome, the lower being disposed suitably inside the refrigerator 1, whilst the upper 3 in order to obtain cooling space is arranged above the refrigerator inside a dome-shaped heat insulated extension 4. The upper chamber 3 is provided at its upper end with the gas tight closure member 5, into which leads the suction pipe 15, which leads to the injector pump 19, and also the supply pipe 21 which reaches to the bottom of a supply container 22 for the cooling agent.

The two chambers 2 and 3 are connected by a cone valve seating 4a and can be shut off from one another by the cone valve 7 by means of the valve rod 6. On the same valve rod 6, which passes through the two evaporating chambers, is situated within the closure member 5 a further cone valve 8 for cutting off the supply pipe 21 for the cooling agent from the chamber 3. At the bottom end of the valve rod 6 there is a third cone valve 9 which has its seating in the valve member 10 at the bottom opening of the chamber 2. A narrow discharge pipe 20 leads from this valve member 10 to the suction pipe 15 in front of the injector pump 19. The three cone valves 7, 8 and 9 are controlled through their common valve rod 6 by the pawl fork 12 which works on the plate 11 at the end of the valve rod 6. The pawl fork 12 and also the weighted pivoted lever 14 are pivoted on a common axis 13 on the valve member 5.

The pivoted lever 14 ensures that the pivoted fork 12 and with it the valve rod 6 can only come to rest in their end positions, thus the highest or lowest position. In these two end positions either as shown in Figure 1 valves 8 and 9 are closed and valve 7 is open, or, as shown in Figures 2 and 3, valve 7 is closed and valves 8 and 9 open. In front of the open end of the suction pipe 15 inside the valve member 5 is disposed a plate or cone valve pivotally mounted on a two armed lever 16, which is closed by the float 17 rising, the latter being prevented from sinking too far by a cross pin 18.

The supply pipe 21 for the cooling agent in the supply container 22 is preferably passed through a sealing device 23 in which a fluid, preferably oil, valve by means of the rising pipe 25, prevents outward flow towards the atmosphere through the air compensation pipe 24.

In Figure 1 the apparatus is shown in the suction or cooling phase. The evaporation chamber 2 is for example filled with 25% ammonium hydrate. The ammonia gas is evaporated by the ejector pump 19 and carried away by the water thereof. When the ammonia solution is impoverished, the valve 7 is closed and thus valves 8 and 9 opened by swinging over the lever 14. As is shown in Figure 2, the evacuating action of the ejector pump acts not only on the suction pipe 15 but also on the discharge pipe 20 through which the impoverished solution 28 is sucked into the water stream, whilst the cooling agent owing to the fall of pressure in the container 3 is pressed out of the supply container 22 into said container 3 through the supply pipe 21.

The cooling agent 26 collecting in the preliminary container 3 raises the float 17 so that it closes the suction pipe 15 and the supply of the cooling agent is interrupted, as is shown in Figure 3. Thus a fresh quantity of the cooling agent is supplied to the evaporator whilst the impoverished solution is removed therefrom.

By swinging over the pivoted lever 14 the cone valve 7 is opened and the valves 8 and 9 are closed. The cooling agent flows down into the chamber 2, the sinking float 17 frees the suction pipe 15 and a new evaporation phase is started.

The exhausted solution can be emptied from the evaporator without using the ejector pump if the valves 7, 8 and 9 are held open in a mid position of the pivoted lever.

When the apparatus is used for a cooling agent which evaporates without residue, valve 9 and the leading off pipe 20 can be omitted.

The above arrangement of the valves has the special advantage that the valves 8 and 9 communicating with the outside are always liquid sealed and therefore can easily be kept vacuum tight.

The evaporator can be provided with cooling ribs in the usual way. It can be provided with cold storage devices and ice making machines and the like. Moreover the cylindrical evaporator could instead be made as a flat evaporator in order to provide a more convenient arrangement of the cooling space.

Another construction according to the invention is shown purely diagrammatically in Figure 4 in which the preliminary container does not form part of the evaporator unit but is disposed apart from the same preferably below the supply container for the cooling agent.

The supply container 33 is arranged underneath the regfrigerator and in this case also has an oil closure 25 and is filled with the cooling agent 26. Below the supply container is arranged the preliminary container 34 which is preferably filled gradually through a capillary tube 35, the air being pressed out through the over-flow pipe 36.

From the preliminary chamber 34 the conduit 21 leads to the upper valve member 8 on the evaporator 2. In the evaporator 2 the vacuum is again produced by the ejector pump 19, which is again connected to the evaporator through the pipe 15.

When a charge of the evaporator is used up, the cone valve 9 at the bottom of the evaporator is opened by the valve rod 6 and the impoverished solution can flow away through the pipe 20 even when the pump is at rest. If then valve 9 is closed, the pump set in operation and the valve 8 opened, the correct quantity of cooling agent flows out of the preliminary container 34 into the evaporator. Because the filling time is brief, during this period only a small quantity of the cooling agent oozes through the capillary tube 35, and the filling of the preliminary chamber 34 is only accomplished during the lengthy evaporation periods. Then the valve 8 is closed and thus the actual evaporation process is begun.

The two valves 8 and 9 may conveniently be moved by a cam 31 movable about a pivot 30 by means of a pivoted lever 32. This cam, according to its position, either raises the valve 9 through the valve rod 6 and the abutment provided at its end or raises the valve 8 through a tubular valve shaft 29 passing concentrically round rod 6 which also has an abutment at its upper end. In the mid position of the cam 31 both valves are closed.

Naturally the supply container and the preliminary container can be arranged above the evaporator so that the refilling of the evaporator can be effected with pumps in permanent operation.

To simplify control the pivoted lever of all constructions can be automatically regulated instead of manually. For example the pivoted lever can be coupled to the water supply of the ejector pump, for instance by spring bellows, so that on turning on and cutting off the water supply the pivoted weight is moved. The pivoted lever can also for example be controlled by a time regulated automatic device.

Figure 5 shows an apparatus which without the devices set out above insures a completely continuous operation both as regards the supply of the cooling agent thereto and as regards its leading off.

Inside the refrigerator 1 is disposed the evaporator 40 constructed as a spiral tube, which conveniently is mounted in a chamber 39 made as a cold storer and filled for instance with brine. The evaporator 40 is fed with the cooling agent 26 from the supply container 22 through the rising pipe 21 and the cooling agent passes through the capillary throttle 37 before entering the spiral evaporator 40 owing to which it enters the evaporator continually in definite small quantities. The bottom end 38 of the spiral evaporator 40 leads to the ejector pump (not shown here), which both supplies the cooling agent through the capillary throttle 37 and also causes the evaporation of the dissolved gas and leads off the impoverished solution.

It is desirable to lead as much as possible of the cooling agent supply pipe 21 through the inside of the discharge pipe 38, so as to cause a preliminary cooling of the cooling agent on the counter current principle by the cold gases sucked out and the outflowing impoverished solution.

In order to retard the speed of flow of the cooling agent through the apparatus and to obtain a greater operative surface, the evaporator, as shown by way of example in Figure 8, can partly be filled with porous filling material 52, for example granulated silica, granulated carbon, textile materials and the like.

Figures 6 and 7 show so-called small refrigerating devices as are especially suitable for cooling drinks and for making edible ices, Figure 6 being a drink cooler for periodic use and Figure 7 an ice making machine for continuous use.

In Figure 6, 2 is a small cylindrical evaporator which is preferably covered on the inside with porous wick material 41 and before operation is filled with the cooling agent 26. The gas evolved is led to the ejector pump 19 through the bend and through the hose conduit 42. The evaporator 2 dips into the drink which is placed in a Dewar flask 54.

In Figure 7 a container 43 for receiving the material to be cooled is surrounded by a spiral channel 44. The container 43 is made gas-tight in the insulating container 47. The discharge pipe 45 leads out of the bell shaped hollow space between the containers 43 and 47 to the ejector pump (not shown in this case). The rising pipe 21 leads out of the supply container 22 filled with cooling agent 26 and through the capillary throttle 37 to the top end of the spiral channel 44.

By operating the ejector pump the cooling agent is moved in the spiral channel, and during its downward flow heat is withdrawn from the material to be cooled in the container 43. The frozen material can easily be lifted out by the wing handle 48 of the double cross 51 which is fastened to the screwed spindle 50, by turning which the double cross 51 is raised by the thread 49 and the frozen material released from the sides of the container. The whole apparatus is closed by the insulating cover 46.

In this apparatus, also, the channel 44 can be covered with porous material, such as wick or felt 53, as is shown in Figure 9.

In the continuously working arrangements according to Figures 5 and 7 the cooling agent need not be led along a spiral path, but for instance in the apparatus shown in Figure 5 a cylindrical evaporator can be used, filled with granulated silica or similar porous filling, which is traversed by the cooling agent flowing downwards. Also in the apparatus according to Figure 7 the bell shaped space can be filled with porous filling material so that the channel 44 can be omitted.

Especially with ice making apparatus, to obtain a quick freezing throughout, it is desirable to shape the hollow space for receiving the substance to be frozen so that the frozen material is obtained in the form of thin plates or the like, because the heat conducting surfaces with this shape are great in relation to the quantity of material to be frozen.

In order not to lose the cooling agent and to make it usable for other purposes, it is desirable to insert between the evaporator and the vacuum pump a container with an absorbent liquid in it, for example when using ammonium hydrate as cooling agent this container should be filled with sulphuric acid or the like which converts the escaping ammonia into a salt, thus into a non-volatile form. Thus the ammonia is not lost with the driving water of the pump but a valuable ammonium salt is obtained which can be used for known purposes.

What we claim is:—

1. Apparatus for the production of cold on the open circulation system comprising a supply container containing a strong gas-containing liquid, an evaporator continuously supplied with said liquid, a discharge pipe for the impoverished solution leading from said evaporator to a pump and flow retarding means for the liquid associated with said evaporator.

2. Apparatus for the production of cold on the open circulation system comprising a supply container containing a strong gas containing liquid, an evaporator continuously supplied with said liquid, and a discharge pipe for the impoverished solution leading from said evaporator to a water jet pump.

3. Apparatus for the production of cold on the open circulation system comprising a supply container containing a strong gas containing liquid, an evaporator supplied with said liquid, and a discharge pipe for the impoverished solution leading from said evaporator to a water jet pump.

4. Apparatus for the production of cold on the open circulation system comprising a supply container containing a strong gas containing liquid, an evaporator supplied with said liquid, a discharge pipe for the impoverished solution leading from said evaporator to a pump, and flow retarding means for the liquid associated with said reservoir.

In testimony whereof we have signed our names to this specification.

Dr. WALTHER DIETRICH.
Dr. KLEMENS BERGL.